Jan. 5, 1965

F. C. BOLICK, JR 3,164,434

INDICATING DEVICE

Filed Feb. 25, 1963

INVENTOR.
Fred C. Bolick, Jr.

BY Newton, Hopkins & Jones

ATTORNEYS

Jan. 5, 1965    F. C. BOLICK, JR    3,164,434
INDICATING DEVICE
Filed Feb. 25, 1963    2 Sheets-Sheet 2
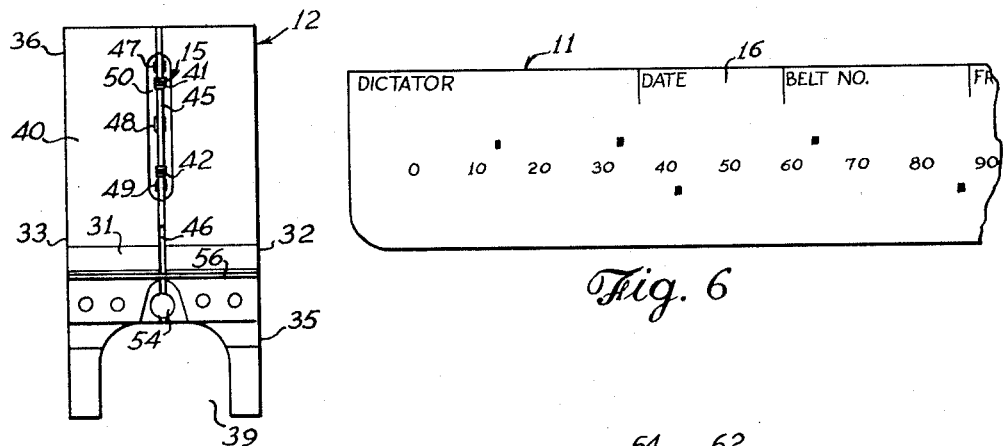
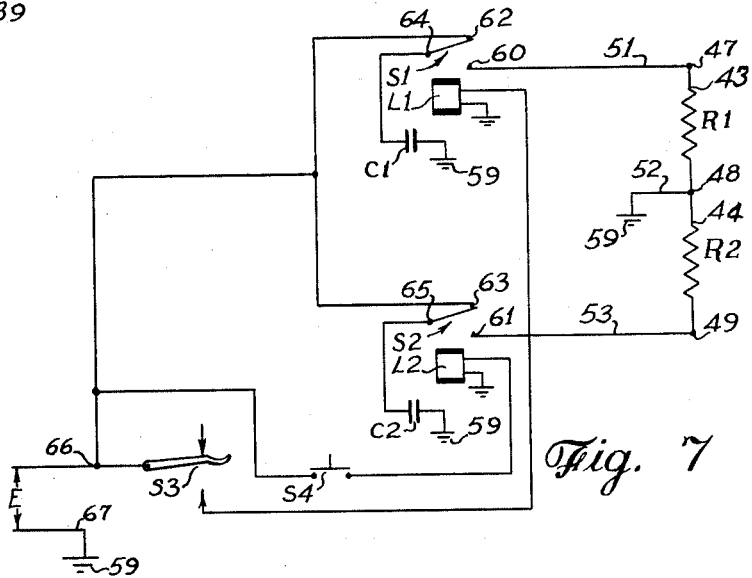
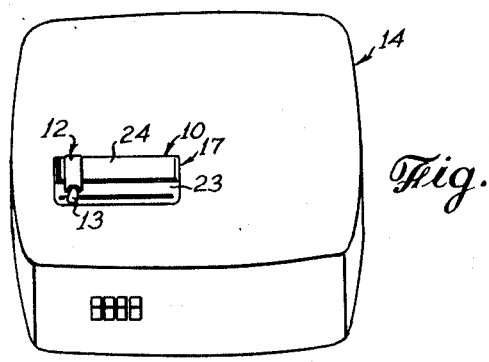
INVENTOR.
Fred C. Bolick, Jr.
BY
Newton, Hopkins & Jones
ATTORNEYS

United States Patent Office 3,164,434
Patented Jan. 5, 1965

3,164,434
INDICATING DEVICE
Fred C. Bolick, Jr., 1440 Pineway Drive NE.,
Atlanta, Ga.
Filed Feb. 25, 1963, Ser. No. 260,780
5 Claims. (Cl. 346—76)

The invention relates to a device for recording information on a recording surface and more particularly to an indicating device for use with conventional dictating machines to indicate corrections and the ends of units of dictation on the recording record for a particular record, tape or other similar recording medium.

The widespread use and demand for dictating equipment has resulted in many efforts to adapt dictating equipment to the operational requirements of various offices and businesses. It has been found that one of the most economical and convenient means for meeting the requirements of the medium or large size office for dictation equipment is the centrally-located recording unit connected to a plurality of remotely-located dictating units such as microphones or hand sets. Such an arrangement of dictation equipment not only requires that the information be transmitted from the remotely-located dictating units to the recording unit, but it also requires that the status of the recording unit be transmitted from the recording unit to each of the remotely-located dictating units so that the dictator may know when the end of a tape, record or other recording medium has been reached.

This last requirement is frequently met by providing a switch means responsive to the position of the recording record indicator customarily found on conventional recording units. The switch means operates when the end of the recording medium is reached or is about to be reached. The operation of the switch means causes a visual signal or other indication of the condition of the recording unit to appear at the remotely-located dictating unit.

A major difficulty with these remote arrangements of dictation equipment is that no simple means has been previously devised for the remotely-positioned dictator to indicate corrections and the ends of units of dictation on the recording record of the recording unit. As a matter of fact, even when the recording unit and dictating unit are not remote from each other, the marking of corrections and the ends of units of dictation on the recording record of a recording unit has not been accomplished in a wholly satisfactory manner. This is because it has been frequently accomplished by using an easily erased pencil mark or some complicated mechanical structure which is difficult and expensive to maintain. It is readily apparent that where the dictating unit is located remote from the recording unit, the marking of the recording record with a pencil is impossible and the mechanical structures become difficult to operate and even more difficult and expensive to maintain.

The present invention is an indicating device which completely eliminates this previous difficulty with dictation equipment arrangements having centrally-located recording units and remotely-located dictating units. It permits a dictator at a remotely-located dictating unit to clearly mark corrections and the ends of units of dictation on the recording record of a recording unit without employing complicated and expensive mechanical structure. Moreover, the device provides an improved means for marking the recording record of a recording unit even when the recording unit and dictating unit are not remote from each other. The mark made on the recording record is clear, accurately located, and can not be accidentally erased. Furthermore, mechanical elements are few and the invention is inexpensive to manufacture and easy and convenient to install, use and maintain.

These and other features and advantages of the invention will be more clearly understood from the following detailed description and the accompanying drawings, in which like characters designate corresponding parts in all figures and in which:

FIG. 5 is a rear elevation view of the marker of the indicating device.

FIG. 6 is a partial elevation view of the scale of the indicating device.

FIG. 7 is a schematic wiring diagram showing an electrical circuit which may be used for either remote or local operation of the indicating device.

FIG. 8 is a perspective view of a conventional recording unit having the indicating device mounted thereon.

Figure 1:
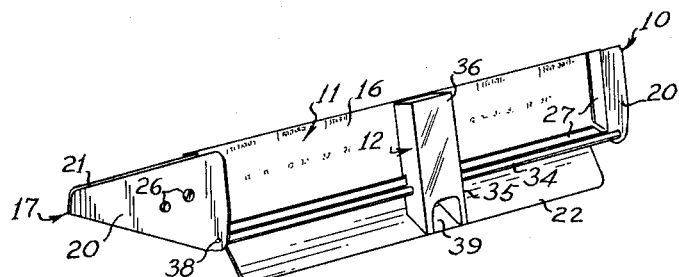
FIG. 1 is a perspective view of the indicating device.
Figure 2:
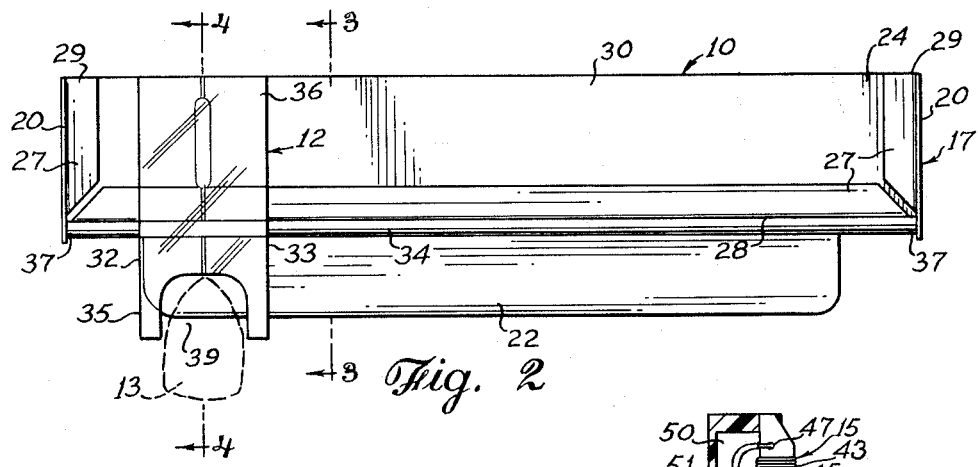
FIG. 2 is a front elevation view of the indicating device showing the recording record indicator of a conventional dictating machine in outline and positioned to urge the marker of the indicating device along the scale.
Figure 3:
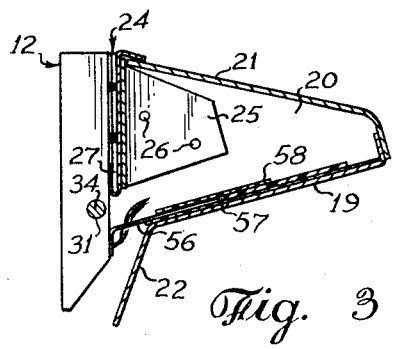
FIG. 3 is a cross-section view of an indicating device taken along line 3—3 in FIG. 2.
Figure 4:
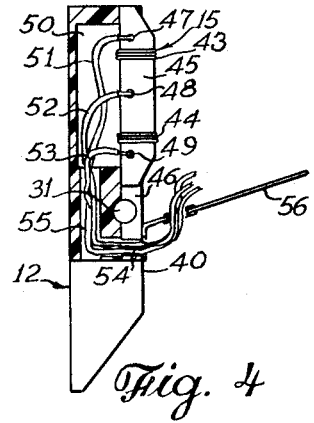
FIG. 4 is a cross-section view of the marker of the indicating device taken along line 4—4 in FIG. 2 but with the frame and scale of FIG. 2 omitted for clarity.

These drawings and the following detailed description disclose a preferred specific embodiment of the invention, but the invention is not limited to the details disclosed since it may be embodied in other equivalent forms.

The indicating device 10 is most easily understood by considering it to be comprised of a heat sensitive scale 11, a marker 12 mounted for slidable motion along said scale 11 in response to the motion of the recording record indicator 13 of a conventional recording unit 14, a plurality of heating elements 15 in the marker 12 and engaging the surface 16 of the scale 11, and control means for controlling the heat of the heating elements 15 by switches remote from or adjacent to the recording unit 14. The scale 11 and the marker 12 are mounted on a frame 17 which is adapted for positioning the marker 12 and scale 11 on a conventional recording unit 14 adjacent to the recording record indicator 13 of the recording unit 14 as shown in FIG. 8.

The detailed structure of the frame 17 will vary in accordance with the structure of the recording unit 14 with which the indicating device 10 is to be used. In the specific embodiment of the invention described herein the frame 17 has a base plate 19, two triangular end plates 20 and a cover 21. The base plate 19 has a flange 22 which aids in fixedly but removably attaching the frame 17 to a conventional recording unit 14. The flange 22 is inserted between the recording record indicator 13 and recording scale 23 of the recording unit 14 and base plate 19 of the frame 17 rests on or in the recording unit 14. Thus, the frame 17 is not only attached to recording unit 14, but the recording indicator 13 of the recording unit 14 moves along the length of flange 22 as recording with the recording unit 14 progresses.

The scale 11 is mounted in a scale holder 24 extending between the end plates 20 of the frame 17 above the flange 22. The scale holder 24 has tabs 25 at its ends and is attached to the end plates 20 of the frame 17 by inserting screws 26 through the end plates 20 of the frame 17 and into the tabs 25 of the scale holder 24. In addition, the scale holder 24 has lips 27 at its lower edge 28 and at its two side edges 29. The scale 11 is inserted into the scale holder 24 with three of its edges betwen the lips 27 and the face 30 of the scale holder 24. Thus, scales 11 may be easily and quickly inserted into and removed from the scale holder 24 each time the recording medium, such as tape or record, of the recording unit 14 is changed.

The marker 12 is a substantially rectangular block of plastic or of some other similar material which will not conduct electricity and has a channel 31 extending through it from its left side 32 to its right side 33. The marker 12 is mounted for slidable motion in the frame 17 by inserting a rod 34 through the channel 31 and by positioning the rod 34 between the end plates 20 of the frame 17 so that the lower portion 35 of the marker 12 will move parallel and adjacent to the flange 22 and the upper portion 36 of the marker 12 will move parallel and adjacent to the face 30 of the scale holder 24 as the marker 12 moves along the rod 34. The rod 34 is fixedly attached to the end plates 20 in this position by inserting its ends 37 into holes 38 in the end plates 20 of the frame 17.

The lower portion 35 of the marker 12 has a recess 39 cut into its lower edge. Since both the lower portion 35 of the marker 12 and the recording record indicator 13 of the recording unit 14 are adjacent to and move along the length of the flange 22 when the frame 17 is mounted on a recording unit 14, it is into this recess 39 that the recording record indicator 13 is inserted when the frame 17 is mounted on a recording unit 14. Thus, as the recording record indicator 13 of the recording unit 14 moves forward with use in the conventional manner, it will move the marker 12 along the length of the rod 34 and of a scale 11 mounted in the scale holder 24. As a result, the position of the marker 12 along the length of the scale 11 at any given moment during the recording of information on a recording medium will be directly related to the position of the recording record indicator 13 relative to the recording scale 23 of the recording unit 14. Since the position of the recording record indicator 13 relative to the recording scale 23 is directly related to the portion of the recording medium on which information is being placed at the moment, a mark on scale 11 will be directly related to a portion of the recording medium and can be used to indicate the presence of a correction or end of a unit of dictation in this portion of the recording medium.

The invention provides for a mark being made on the scale 11 by the application of heat to the heat sensitive surface 16 of the scale 11. The surface 16 is made heat sensitive by the application of any of the known substances which change color in the presence of heat, preferably heat of approximately 180 degrees F. The necessary heat is obtained by providing the rear surface 40 of the marker 12 which is adjacent to the scale 11 with two heating elements 15. One heating element 15 is the upper heating element and is positioned to engage the upper half of the scale 11 as the marker 12 travels along the length of the scale 11 and the other heating element is the lower heating element and is positioned to engage the lower half of the scale 11 as the marker 12 travels along the length of the scale 11.

In the specific embodiment of the invention described herein, the heating elements 15 are an upper coil 43 and a lower coil 44 wound about a coil support blade 45 which is inserted into a slit 46 in the rear surface 40 of the marker 12 so that a portion of each coil 43 or 44 extends beyond the rear surface 40 of the marker 12 and engages the surface 16 of the scale 11. The coil support blade 45 has three terminals 47, 48 and 49 spaced along its length. The upper coil 43 is terminated at one end on the upper terminal 47 and at its other end on the middle terminal 48 and the lower coil 44 is terminated at one end on the middle terminal 48 and at its other end on the lower terminal 49.

The marker 12 has a cavity 50 into which the coil support blade 45 extends through the slit 46 and three leads 51, 52 and 53 are brought into this cavity 50 from the base plate 19 of the frame 17 through a hole 54 and a vertical channel 55 in marker 12. Within the marker 12 these three leads 51, 52 and 53 are terminated to the three terminals 47, 48 and 49, respectively, of the coil support blade 45 and at the base plate 19 they may be terminated on a terminal strip or collected into a cable. In any event, the three leads 51, 52 and 53 provide a means for connecting the two heating elements 15 of the marker 12 to an appropriate circuit. Moreover, the leads 51, 52 and 53 are of sufficient length so that they do not inhibit the motion of the marker 12 as it is slidably moved along the rod 34 by the recording record indicator 13 of the recording unit 14.

The heating elements 15 of the marker 12 are held in slidable engagement with a scale 11 mounted in the scale holder 24 of the frame 17 by a spring plate 56 having one end attached to the lower portion 35 of the marker 12 and its other end inserted and slidably movable in a channel 57 formed on the base plate 19 by fixedly positioning a cam plate 58 above the base plate 19. The resiliency of the spring plate 56 and the pressure of the cam plate 58 on its inserted end tends to rotate the marker 12 about the rod 34 and forces the upper portion 36 of the marker 12 toward the scale 11 so that the heating elements 15 maintain constant contact with scale 11.

The heating elements 15 may be electrically energized and heated using a variety of circuits. However, the circuit shown in the schematic diagram of FIG. 7 possesses a number of advantages whether the indicating device 10 is used with a remotely or locally located dictating unit. In the schematic diagram of FIG. 7, the upper coil 43 is the resistor R1 and the lower coil 44 is the resistor R2. It will be seen that the lead 52 from the middle terminal 48 of the coil support blade 45 is connected to ground 59, the lead 51 from the upper terminal 47 of the coil support blade 45 is connected to the first terminal 60 of switch S1, and lead 53 from the lower terminal 49 of the coil support blade 45 is connected to the first terminal 61 of switch S2. Thus, the upper coil 43 is connected between ground 59 and switch S1 and the lower coil 44 is connected between ground 59 and switch S2. Switches S1 and S2 are double-throw switches electro-magnetically operated by solenoid coils L1 and L2, respectively.

In addition to their first terminals 60 and 61, each switch S1 or S2 has a second terminal 62 or 63, and a third terminal 64 or 65. When solenoid L1 is not energized, switch S1 makes a circuit between terminals 62 and 64 and when solenoid L1 is energized, switch S1 makes a circuit between terminals 60 and 64. Similarly, when solenoid L2 is not energized, switch S2 makes a circuit between terminals 63 and 65 and when solenoid L2 is energized, switch S2 makes a circuit between terminals 61 and 65.

Terminal 62 of switch S1 and terminal 63 of switch S2 are connected in parallel to one terminal 66 of a direct current voltage source E which has its other terminal 67 to ground 59. Terminal 64 of switch S1 is connected to ground 59 through a capacitor C1 and terminal 65 of switch S2 is connected to ground 59 through a capacitor C2. Thus, when solenoids L1 and L2 are not energized, the voltage E is in series to ground 59 with both capacitor C1 and capacitor C2 and both will be charged by the voltage E. If the capacitors C1 and C2 are identical, as is preferable, and since they are in parallel, the charge on capacitor C1 will be identical to that on capacitor C2 and will be a function of capacitor capacity and voltage E.

It is readily apparent from what has been said that if solenoid L1 is energized, the capacitor C1 will be placed in series to ground 59 with the upper coil 43. The capacitor C1 will discharge through the upper coil 43 and the current through the upper coil 43 will be a function of the voltage E, the resistance R1 of the upper coil 43 and capacity of the capacitor C1. Since the heat generated in the upper coil 43 by the flow of current is a function of the resistance of R1 and this current, it follows that heat resulting from the discharge of C1 is a function of the voltage E, the resistance R1 and the capacity of capacitor C1.

Similarly, if solenoid L2 is energized, the capacitor C2 will be placed in series to ground 59 with the lower coil 44. The capacitor C2 will discharge through the lower coil 44 and the current through the lower coil 44 will be a function of the voltage E, the resistance R2 of the lower coil 44 and the capacity of the capacitor C2. The heat generated in the resistance R2 by the discharge of the capacitor C2 is a function of the voltage E, the resistance of R2, and the capacity of C2.

The heat generated in both the upper coil 43 and the lower coil 44 is a function of the parameters of the circuit and if R1 and R2 are equal as well as C1 and C2 being equal, the heat of the upper coil 4 will equal the heat of the lower coil 44. On the other hand, the heat of the coils 43 and 44 may be made to differ by simply changing the value of either R1, R2, C1 or C2. Moreover, regardless of the circuit parameters selected, for a constant voltage E, the heat of upper coil 43 or the lower coil 44 will be the same each time either coil L1 or coil L2 is energized, provided capacitor C1 or capacitor C2 is completely discharged. Thus, the circuit of FIG. 7 permits the heat which either the upper coil 43 or the lower coil 44 will apply to the surface 16 of the scale 11 to be freely selected and to be constant through repeated applications of heat.

This control of the heat which either the upper coil 43 or the lower coil 44 will apply to the surface 16 of the scale 11 insures that the mark made on the scale 11 by the heat is well formed, yet discrete. Too little heat will result in a mark which can not be easily seen and too much heat will cause a spreading on the surface 16 of the scale 11 of the color changing effects of the heat with the result that the intended location of the mark on the scale 11 will be uncertain.

The coil L1 and the coil L2 are energized by placing each in series to ground 59 with a switch S23 or S4 and the voltage E. The switch S3 is a hook switch which closes the circuit through solenoid L1 only when depressed. The switch S4 is a push button switch and closes the circuit through solenoid L2 only when depressed. Both switches S3 and S4 remain closed after being depressed for a sufficient length of time to energize solenoids L1 and L2 for that period of time required for capacitors C1 and C2 to completely discharge through switches S1 and S2.

The switches S3 and S4 may be located either adjacent to or remote from the recording unit 14 on which the frame 17 is mounted. Regardless of location, the closing of switch S3 will cause a mark to appear on the scale 11 as a result of the heat of upper coil 43 and the closing of switch S4 will cause a mark to appear on the scale 11 as the result of the heat of lower coil 44. Since the lower coil 44 engages only the lower half of scale 11, the mark resulting from the operation of switch S4 will appear on the lower half of the scale 11 and is used to indicate that a correction has been made in that portion of the recording medium corresponding to the position of the marker 12 along the length of the scale 11 when the switch S4 is depressed.

The upper coil 43 engages only the upper half of the scale 11 and the mark on the scale 11 resulting from the operation of switch S3 will appear on the upper half of the scale 11 and is used to indicate that the end of a unit of dictation is at that point on the recording medium corresponding to the position of the marker 12 along the length of the scale 11 when switch S3 is depressed.

Correction marks and end of unit of dictation marks are clearly distinguishable because they are on different halves of the scale 11. Although the indicating device 10 is particularly suitable for use with switches S3 and S4 remote from the recording unit 14, both types of marks are as easily placed on the scale 11 from a location adjacent to the recording unit 14 as from a location remote from the recording unit 14 and regardless of the location of switches S3 and S4, the indicating device 10 does not employ expensive mechanical elements which are difficult to install and use. Moreover, the quality of the marks on the scale 11 is fixed, constant and independent of the dictator or operator using the indicating device 10. Sustained depressing of either switch S3 or S4 will not alter the heat which either upper coil 43 or lower coil 44 applies to the scale 11 with each depression of either switch S3 or S4.

It will be obvious to those skilled in the art that many variations may be made in the embodiments here chosen for the purpose of illustrating the present invention without departing from the scope thereof as defined by the appended claims.

What is claimed as invention is:

1. A device for indicating the presence of information on a portion of the recording medium of a dictating machine, said device comprising, in combination, a scale having a surface which changes appearance in the presence of heat; a heating element arranged for motion adjacent to the surface of the scale and to bear against said scale; means responsive to the portion of the recording medium on which recording is occurring for positioning the heating element with respect to the surface of the scale; means to connect a capacitor alternately to a source of voltage and to said heating element for causing said heating element to conduct a predetermined surge of heat to said scale.

2. A device for marking a heat sensitive surface with the heat generated in a resistance element by the flow of current therethrough, said device comprising, in combination, a marker having said resistance element wound therearound and positioned with the resistance element in contact with said heat sensitive surface, a condenser, a double throw switch arranged to alternately connect said condenser in series with a source of voltage and then with said resistance element.

3. In a device for selectively indicating the presence of information on the recording medium of a recording machine having a marking element for marking a scale; the improvement therein of actuating means for actuating said marking element comprising a capacitor arranged to be alternately connected with a source of line electricity and with said marking element.

4. In a device for selectively indicating the presence of information on the recording medium of a recording machine having an electrical marking element for marking a scale; the improvement therein of actuating means connected to said marking element wherein during the period when said marking element is actuated by said actuating means the line voltage is disconnected from said marking element.

5. In a recording machine, a heat sensitive scale mounted on said machine, heat marking means arranged to bear against said scale and including a first heating coil and a second heating coil spaced therefrom, said coils being arranged to contact said scale and produce square dots at laterally spaced points on said scale, said heat marking means being constructed so as to traverse said scale in accordance with the position of a recording head relative to a recording medium of the machine, means to selectively energize said marking means including a source of voltage, two manually operable switches connectable to said source of voltage, said switches each being operably connected to a double throw relay switch, each of said relay switches being operable to alternately connect a capacitor first to said voltaged source and then to one of said coils.

References Cited by the Examiner
UNITED STATES PATENTS

| | | | |
|---|---|---|---|
| 2,628,841 | 2/53 | Dann et al. | 274—1 |
| 2,898,112 | 8/59 | Flower et al. | 274—1 |
| 2,992,060 | 7/61 | Roberts | 346—76 |
| 3,046,019 | 7/62 | Holladay et al. | 274—1 |

LEYLAND M. MARTIN, *Primary Examiner.*

LEO SMILOW, *Examiner.*